Figure 1:
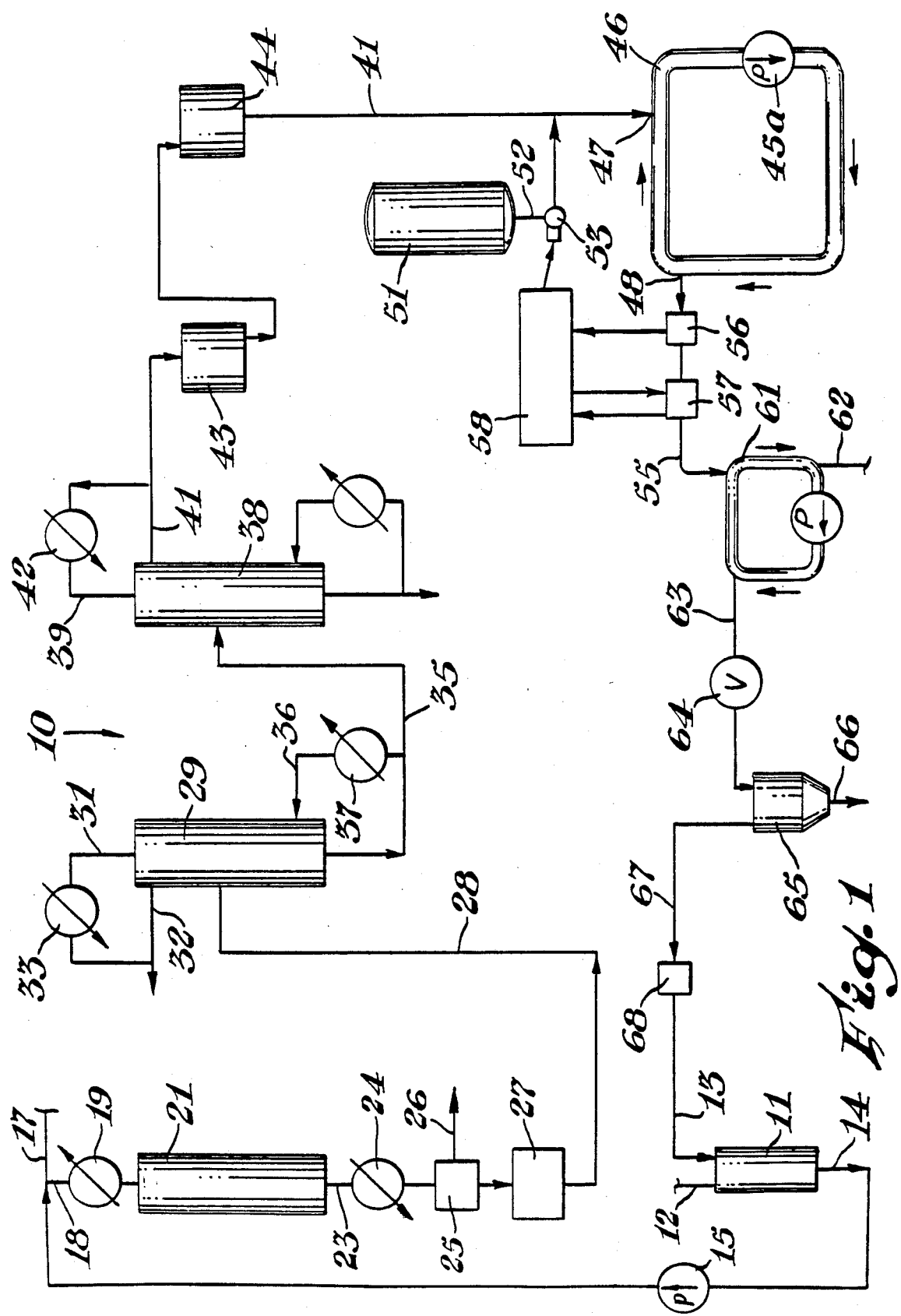

United States Patent [19]

Priddy et al.

[11] Patent Number: 4,572,819
[45] Date of Patent: Feb. 25, 1986

[54] APPARATUS FOR ANIONIC POLYMERIZATION WHEREIN THE MOLECULAR WEIGHT OF THE POLYMER IS CLOSELY CONTROLLED

[75] Inventors: Duane B. Priddy; Michael Pirc, both of Midland, Mich.

[73] Assignee: The Dow Chemical Company, Midland, Mich.

[21] Appl. No.: 633,834

[22] Filed: Jul. 24, 1984

Related U.S. Application Data

[62] Division of Ser. No. 525,863, Aug. 24, 1983.

[51] Int. Cl.$^4$ .......................... G01N 21/75; C08F 2/06
[52] U.S. Cl. ...................................... 422/62; 422/111; 422/116; 422/132
[58] Field of Search ................. 422/62, 111, 116, 131, 422/132, 135; 526/59, 60, 62, 64; 364/500

[56] References Cited

U.S. PATENT DOCUMENTS

| | | | |
|---|---|---|---|
| 2,989,517 | 6/1961 | Hanson et al. | 526/64 |
| 3,257,363 | 6/1966 | Miller et al. | 526/59 |
| 3,493,345 | 2/1970 | Windley | 526/59 |
| 3,506,640 | 4/1970 | Reid et al. | 422/62 |
| 3,553,295 | 1/1971 | Bean, Jr. et al. | 526/60 |
| 3,998,995 | 12/1976 | Buss et al. | 526/59 |
| 4,153,766 | 5/1979 | Koide et al. | 526/59 |
| 4,361,538 | 11/1982 | Dicoi et al. | 422/62 |

Primary Examiner—David L. Lacey

[57] ABSTRACT

An anionic polymerization apparatus includes a continuously stirred reactor, a conduit connected to the discharge of the continuously stirred tank reactor, the conduit being in operative communication with an optical apparatus to provide a first signal which varies as molecular weight of polymer in effluent from the continuously stirred tank reactor varies, the first signal passing to a flow control apparatus adjusting the initiator flow control apparatus to thereby provide molecular weight control of a polymer being prepared, a gel permeation chromatograph adapted to receive effluent from the continuously stirred reactor and measure the molecular weight of a polymer and provide a second signal indicative of the molecular weight of the polymer to the optical apparatus and adjust the optical apparatus to provide a desired first signal to thereby provide a polymer of a generally uniform molecular weight.

2 Claims, 3 Drawing Figures

APPARATUS FOR ANIONIC POLYMERIZATION WHEREIN THE MOLECULAR WEIGHT OF THE POLYMER IS CLOSELY CONTROLLED

This is a divisional of application Ser. No. 525,863, filed Aug. 24, 1983.

This application is a continuation in part of the copending application Ser. No. 364,959, filed Apr. 2, 1982, now abandoned.

The present invention relates to a novel process and apparatus for the control of anionic polymerization reactions in a continuous stirred tank reactor. The term continuous stirred tank reactor refers to any reactor wherein material is continuously or continually added to the reactor and material removed from the reactor at about the same rate as material is added thereto. The contents of the reactor being maintained in a generally homogeneous condition both from a composition and a temperature point of view. Thus, a continuous stirred tank reactor may have the configuration of conventional stirred cylindrical or spherical tank, or it may be a loop wherein material is rapidly recirculated within the loop. Polymerization is frequently carried out employing a plug flow reactor wherein the composition at the inlet end is very different from that at the outlet end and a temperature gradient may exist therein. Such is not true with a continuous stirred tank reactor. Oftentimes, it is desirable to prepare polymers employing anionic initiators in a continuous stirred tank reactor wherein monomers or monomer and optionally a diluent are continuously added and anionic polymerization initiating compound is also continuously added, the material being removed from the reactor containing solvent and polymer. Volatile materials are generally removed from the polymer and the polymer formed into pellets for further processing. A highly desirable characteristic for commercial polymers is uniformity of both the composition and molecular weight. If a process produces polymer of varying molecular weight at different times, it involves considerable expense and labor to store the different molecular weight polymers and then blend various batches to provide a material with apparent uniformity. Various attempts have been made to control anionic polymerization by means of colorimetric devices, on the assumption that if the color of the polymerizing material is the same, the molecular weight of the product must be uniform. This assumption is believed to be in error, as the sensitivity of the colorimeter may vary over extended periods of time. Impurities in monomer, diluent and the like may vary with time as well as the effective amount of the initiator being fed to the reactor. A number of attempts at colorimetric control have been made, some of which are set forth in the following U.S. Pat. Nos.: 2,066,934; 2,897,247; 2,977,199; 3,290,116; 3,468,972; 3,476,729; 3,553,295; 3,743,629; 3,804,593. Oftentimes, variations in molecular weight between batches of a polymer can result in many difficulties in the fabrication thereof. Oftentimes in the preparation of polymers by continuous and batch polymerization, particularly alkenyl aromatic polymers, gels are formed during the polymerization. Such gels are readily recognized on the extrusion of the polymer into strands. Strands containing significant amounts of polymer gel are characterized by a generally lumpy nature, that is the strands have regions of increased and decreased diameter. Gel containing polymers which are extruded into strands or filaments exhibit lumps or slublike formations, the number per unit length being generally proportional to the gel content. Such gel containing polymer is generally unsuited for extrusion because of the visible irregularities in the final product. Gel containing polymers are usually not suitable for injection molding as generally the final product shows surface irregularities which deviate from the configuration of the mold.

It would be desirable if there were available an improved method for the control of anionic polymerization.

It would also be desirable if there were available an improved method for the control of anionic polymerization which provided a product of a generally constant average molecular weight over long periods of time.

It would also be desirable if there were available an improved method for the continuous anionic polymerization of alkenyl aromatic polymers which would produce a generally gel free product.

It would also be desirable if there were available an improved apparatus for the preparation of polymers by anionic polymerization which would provide a product of a generally constant molecular weight.

These benefits and other advantages in accordance with the present invention are achieved in a method for the polymerization of an anionically polymerizable alkenyl aromatic monomer wherein polymerization of the polymerizable monomer is initiated by an organometallic anionic polymerization initiating compound wherein polymerization of the monomer takes place in a continuous polymerization stirred tank reactor wherein polymerization components are continuously added to the reactor and reaction mixture discharged from the reactor at about the same rate as materials are added to the reactor, to thereby provide a product which is generally gel free.

A particularly desirable embodiment comprises providing a first signal which varies with the molecular weight of polymer in the effluent from the reactor, the first signal altering the rate of polymerization initiator addition to the reactor to maintain a generally constant molecular weight of the polymer, measuring the molecular weight of the polymer thereby obtaining a second signal, employing the second signal to compensate a first signal generating means for drift or error in the first signal generating means to thereby maintain a generally uniform molecular weight of the polymer in the reactor effluent.

Also contemplated within the scope of the present invention is an apparatus for the preparation of anionically polymerized alkenyl aromatic polymers, the apparatus comprising in cooperative combination a monomer supply means, a monomer flow control means associated with a discharge of the monomer supply means, an anionic polymerization initiator supply means, an initiator flow control means in association with a discharge of the initiator supply means, a continuously stirred tank reactor having an inlet and an outlet, the inlet of the continuous stirred tank reactor being in operative communication with the monomer flow control means and the initiator flow control means and adapted to receive material therefrom; a discharge conduit connected to the discharge of the continuously stirred tank reactor, the discharge conduit being in operative communication, a means to provide a first signal which varies as molecular weight of polymer in effluent from the continuously stirred tank reactor varies, the first signal adjusting the initiator flow control to thereby provide molecular weight control of a polymer being prepared, means to measure the molecular weight of a polymer and provide a second signal indicative of the molecular weight of the polymer, means to receive the second signal and adjust the means to provide a first signal to thereby provide a polymer of a generally uniform molecular weight.

By the term alkenyl aromatic monomer is meant an anionically polymerizable monomer composition containing at least 50 weight percent of monomer having the formula:

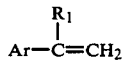

wherein R is hydrogen or methyl, Ar is an aromatic ring structure having from 1 to 3 aromatic rings with or without alkyl substitution wherein any alkyl group contains 1 to 6 carbon atoms, any remaining monomer being monomeric material anionically copolymerizable with the alkenyl aromatic monomer. Typical alkenyl aromatic monomers which may be used alone or in admixture with one another include: styrene, α-methylstyrene, vinyl toluene, all isomers, paratoluene being preferred, ethyl styrene, all isomers, propyl styrene, tertiarybutylstyrene, octylstyrene, vinylnapthalene, vinyl biphenyl, vinyl anthracene and the like, and mixtures thereof.

Anionic polymerization is well known in the art as are anionic polymerizations wherein a color change occurs when polymerization takes place under the influence of an anionic initiator. Representative polymerization systems are set forth in the following U.S. Pat. Nos.: 2,975,160; 3,030,346; 3,031,432; 3,139,416; 3,157,604; 3,159,587; 3,231,635; 3,498,960; 3,590,008; 3,751,403; 3,954,894; 4,183,877; 4,196,153; 4,196,154; 4,200,713; 4,205,016; the teachings of which are herewith incorporated by reference thereto.

Generally, it is desirable to conduct polymerization in accordance with the present invention in the presence of an inert solvent for the polymeric material being formed. The choice and proportion of solvent used, if any, will depend on the availability of the solvent, the particular reactor heat transfer characteristics, ease of devolatilization of the reactor effluent and the like. Typical solvents include benzene toluene, ethyl benzene, ethyl toluene alone or in admixture with minor amounts of alkyl compounds, such as cyclohexane and the like. Generally, the amount of solvent utilized is dependent on the molecular weight of the polymer produced and the mixing ability of the reactor. Usually in the practice of the present invention it is desirable to maintain uniformity of temperature and composition in the reaction mixture within the polymerization vessel during the period when about 99 weight percent of the monomer is converted to polymer. It is desirable that the temperature of the reaction mixture be maintained at ±3 degrees centigrade throughout the reaction mixture and preferably with ±1½ degrees centigrade. In order to obtain the desired temperature and composition uniformity in a recirculating coil reactor, such as the reactor described in U.S. Pat. No. 3,035,033 to Schweitzer, Jr., et al., the volume of material circulating within the coil should be at least 15 times and preferably 25 times the volume of material being added to and discharged from the coil. In the case of a stirred tank, the temperature and composition of the reaction mixture should be generally uniform at all locations within the reaction mixture except that of the region adjacent the point of monomer feed which is within 10 percent of a minor dimension of the tank in the region of the monomer feed point. For the case of a 40 inch diameter tank, 80 inches in height, having an axially disposed agitator being fed monomer radially inwardly through a side of the tank at the bottom, the temperature and composition of the reaction mixture should be generally constant at all locations within the reaction mixture contained within the tank at a location more than four inches from the point of feed. In general, the greater the mixing, the more uniform the product obtained, and the chance of gel formation minimized.

The means for generating the first signal may be any of a variety of sensors which generate a signal indicative of molecular weight of the polymer. Generally, in anionic polymerization, the polymerizing mixture provides a colored anion, for example, as in the polymerization of styrene employing an organolithium initiator, a strong red coloration is induced which is more or less proportionate to the number of end groups present and therefore is indicative of the molecular weight of the polymer. A viscometer is also useful as is an analysis of the number of end groups present. In polymerization done in accordance with the present invention, generally conversion of monomer to polymer exceeds 99 weight percent, and due to the nature of a continuous stirred tank reactor and the rapidity of the polymerization, the solids level is generally constant. For each 1% solids variation in the reaction mixture for polystyrene of about 300,000 molecular weight, the molecular weight will vary about 4,000 gram moles, thus providing a great latitude for the means to generate the first signal. The means to generate the second signal desirably is a device which actually measures the molecular weight of the product in the reaction mixture and provides essentially a standard against which the output of the means to generate the first signal can be compared. Any of a variety of devices may be employed as means to generate the second signal such as a viscometer, light scattering and the like. However, the preferred embodiment of the present invention is to employ a gel permeation chromatograph which alternatively measures the molecular weight of the polymer in the reaction mixture and a standard polymer of known molecular weight to thereby provide maximum reliability.

FIG. 1 schematically represents one embodiment of the invention.

Figure 2:
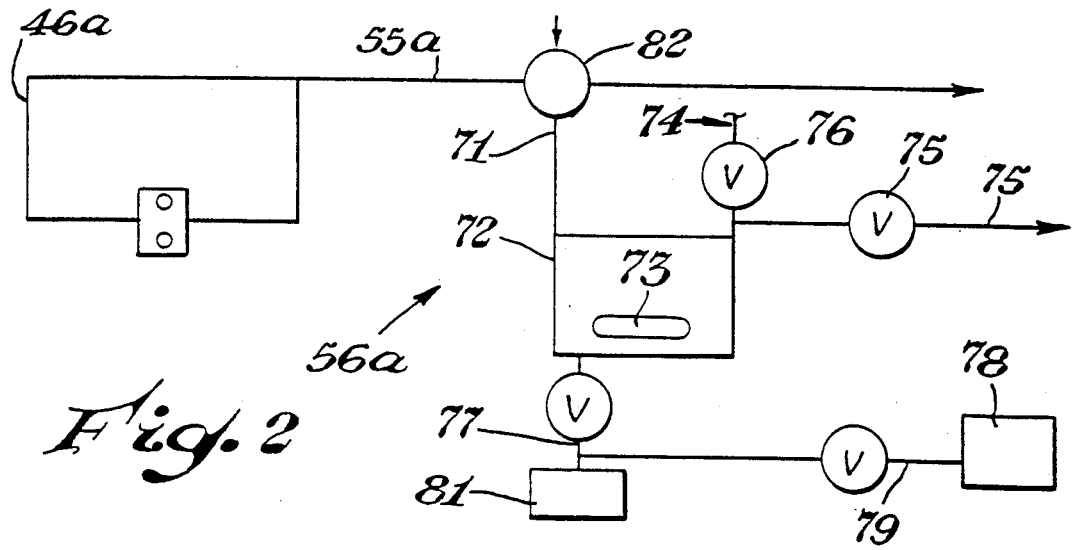
Figure 3:
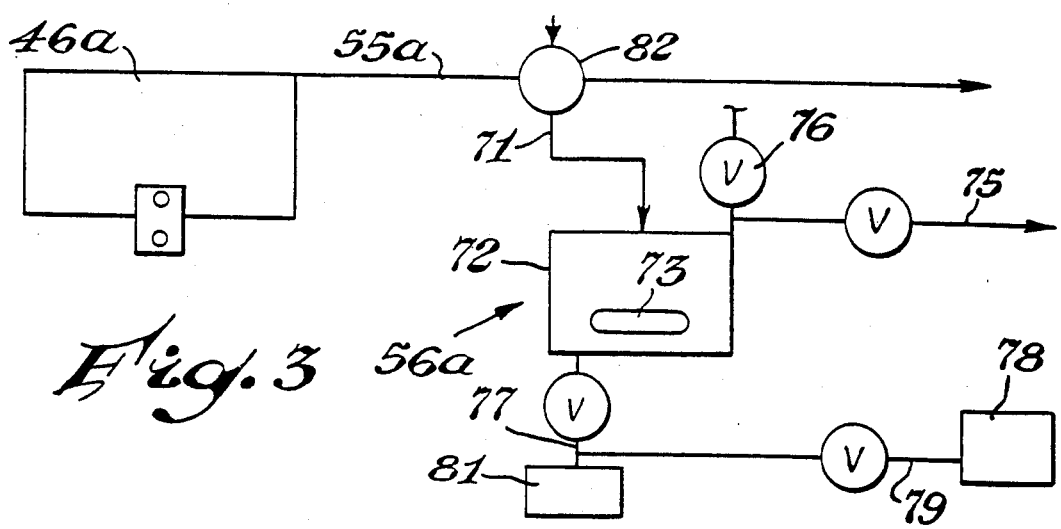

FIGS. 2 and 3 schematically represent a sampling procedure of the arrangement of FIG. 1.

In FIG. 1 there is schematically depicted an apparatus suitable for the practice of the method of the present invention, the apparatus is generally designated by the reference numeral 10. The apparatus 10 comprises in cooperative combination a supply tank 11 having an inlet conduit 12, an inlet conduit 13 and an outlet conduit 14 in which there is disposed a pump 15. The conduit 14 is in communication with a water inlet conduit 17. Both conduits 14 and 17 discharge into a conduit 18 having a heat exchanger 19 disposed therein. The conduit 18 discharges into a cracking column 21. The discharge from the cracking column 21 is to a conduit 23 having heat exchanger 24 therein, a decanter 25, a conduit 26 for the discharge of water and an organic material receiving tank 27. Organic material from tank 27 is forwarded to a distillation column 29 through conduit 28. The distillation column 29 has overhead discharge lines 31 and 32. Discharge conduit 31 has a heat exchanger 33 disposed therein. Conduit 31 connects to and discharges into conduit 32. Distillation column 29 has a discharge conduit 35 and recirculation conduit 36 having heat exchanger 37 disposed therein. Conduit 35 discharges to a second distillation column 38 having overhead discharge conduits 39 and 41, as well as bottoms circulation system similar to column 29. Conduit 39 has a condenser 42 disposed therein. Conduit 41 has disposed therein liquid storage tanks 43 and 44. Tanks 43 and 44 are connected in series. Conduit 41 terminates at a continuous stirred tank reactor 46. The reactor 46 has an inlet 47 and a discharge 48. The reactor 46 has the configuration of a closed loop having a pump 45 therein to provide agitation or circulation of liquid within the reactor 46. An anionic polymerization initiating composition supply tank 51 is in communication with conduit 41 by means of conduit 52. Conduit 52 has disposed therein a flow control means or variable speed pump 53. The discharge opening 48 of the continuously stirred tank reactor 46 is in operative combination with conduit 55. Within conduit 55 is disposed a means or detector 56 to provide a signal which varies with the molecular weight of polymer contained in material flowing through line 55. Also, disposed within the line 55 is a means or detector 57 which provides a first signal which varies as the molecular weight of the material flowing in line 55 varies; for example, a color detector. A control means or computer 58 is in operative combination with means 56, 57 and pump 53. Conduit 55 remote from discharge 48 discharges to a terminating stirred reactor 61. Also connected to terminating stirred reactor 61 is an inlet conduit 62 and a discharge conduit 63 having disposed therein a pressure control valve 64. Conduit 63 discharges to a devolatilizing apparatus 65. The devolatilizing apparatus 65 has a bottoms discharge conduit 66 and an overhead discharge conduit 67. Within line 67 is a quality indicating means 68, such as an infrared spectrometer.

In FIG. 2, there is schematically depicted a sampling arrangement for the determination of molecular weight of a polymer from a polymerizer 46a discharging to a line 55a. As depicted in FIG. 2, a conduit 71 is in selective communication with line 55a. The conduit 71 discharges to a mixing chamber 72 which beneficially is of small volume and has disposed therein an agitator 73. Advantageously, the agitator 73 is magnetically activated. The chamber 72 has associated therewith a nitrogen or other inert gas supply conduit 74 and a vent conduit 75. The conduits 74 and 75 each have a valve disposed therein. The mixing chamber 72 discharges into the conduit 77 to a gel permeation chromatograph. The conduit 77 has a valve disposed therein. A standardizing polymer supply means 78 has associated therewith a valved conduit 79 which is connected to a gel permeation chromatograph 81. The line 77 from chamber 72 also communicates with a gel permeation chromatograph. As depicted in FIG. 2, a suitable solvent such as tetrahydrofuran at a pressure of 60 pounds per square inch gauge is pumped through the gel permeation chromatograph. Material from the polymerizer 46a passes through line 55a and through a four-way valve 82.

In FIG. 3, the four-way valve 82 has been repositioned so that a portion of the material flowing through line 55a passes through conduit 71 to the mixing chamber 72 and is passed through the gel permeation chromatograph 81.

Although the apparatus and method of the present invention can be employed to provide a wide variety of polymers and copolymers, FIG. 1 depicts an arrangement which is particularly suited for the preparation of polystyrene from ethylbenzene. Ethylbenzene is provided to conduit 12 and is stored in tank 11, passed through line 14 and pump 15 to conduit 18 where it is admixed with water and heated in heat exchanger 19 to provide a mixture of ethylbenzene and steam which in turn is passed through the cracking column 21. The effluent from the cracker is passed through line 23 and heat exchanger 24 where the effluent is cooled. The effluent from the cracker column after cooling is passed to the decanting vessel 25 and water is discharged from the conduit 26. Crude styrene passes from the decanting vessel to crude styrene tank 27. From the tank 27 crude styrene is conveyed through conduit 28 to distillation column 29. Distillation column 29 serves to remove low boiling contaminants such as benzene, toluene and residual water. The bottom fraction from first distillation column 29 passes through line 35 with some recirculation and heating through line 36 and heat exchanger 37. Conduit 35 discharges fraction consisting primarily of ethylbenzene and styrene into distillation column 38. The high boiling fraction consisting primarily of tars and cymene is discharged from the bottom of distillation column 38. The overhead fraction from the second distillation column is passed to conduit 41 and through tanks 43 and 44 to the reactor 46. The overhead fraction is a mixture of about equal parts of ethylbenzene and styrene. After being admixed with an anionic polymerization initiator from conduit 52 and pump 53, effluent from the continuously stirred tank reactor 46 is discharged through conduit 55 and the detectors 56 and 57. Conduit 55 discharges into another continuous stirred tank reactor 61 wherein the polymer is admixed with ethanol to deactivate the polymer. The effluent from reactor 61 is passed through conduit 63 and pressure control valve 64 into the devolatilizer 66 wherein ethylbenzene is removed and molten polystyrene is removed from the devolatilizer 65 through conduit 66.

The molecular weight detector 56 provides a signal to a computer 58, the signal being indicative of the weight average molecular weight of the polymer. The color detector 57 also provides a signal to computer 58 and the computer in turn adjusts the set point of the color detector 57 to obtain a generally constant molecular weight polymer. The computer 58 also provides a signal to the pump 53, to thereby provide a desired quantity of the anionic initiator to maintain the desired weight average molecular weight. In practical applications usually continuous monitoring of the molecular weight is not necessary. From a practical standpoint, the molecular weight should be monitored at least about every 8 hours and the set point of the color detector adjusted accordingly. Preferably, the molecular weight and set point adjustment is made every two hours. The molecular weight arrangement 56a as depicted in FIGS. 2 and 3 permits the intermittent sampling of the product stream, dilution of the fixed quantity of the stream, the dilution occurring in the chamber 72, and the material is passed through a gel permeation chromatograph such as 81. To assure close control of the molecular weight of the product and accuracy of the results from the gel permeation chromatograph, a standard is employed. That is, a solution of polymer of known molecular weight and distribution is passed through the gel permeation chromatograph for calibration purposes. Gel permeation chromatography is the preferred method of determining molecular weight; however, other techniques may be utilized, such as melt flow, solution viscosity, light scattering, and vapor phase osmometry and the like.

In the practice of the present invention, it is desirable that the residence time of material in the reactor be from about 1 to about 3 hours. If the residence time is less than about 1 hour, molecular weight control becomes difficult and if the residence time is greater than about 3 hours, the process becomes less economical. It is highly desirable that the polymerization temperature be maintained between about 80° and about 140° C. If the temperature is below about 80° C., the quantity of initiator employed becomes excessive and if the temperature is greater than about 140° C., the conversion of monomer to polymer decreases. The weight percentage of polymer to solvent in the reactor should be between about 30 and 80 weight percent. If the solids content of the reactor is below about 30 weight percent, excessive solvent must be removed to recover the polymer and when the solids content of the reactor is above about 80 weight percent, the viscosity of the reaction mixture is higher than can be handled by most practical processing equipment. The solvent generally desired is an alkyl aromatic material. Most commercially used is ethylbenzene. However, xylene, toluene and the like may be employed. When one considers the feed stream to the reactor for lithium initiated polymerizations, the oxygen content should be held to less than 1 part per million (hereafter ppm) by weight based on the weight of the total feed stream of oxygen. If the oxygen content of the stream is greater than about 1 ppm, it adversely affects the color of the polymer recovered from the reactor. Similarly, water, if present, should be present in an amount less than 10 ppm as it also adversely affects the color of the polymer recovered from the reactor. Active hydrogen, organic compounds such as acetylenes and oxygen-containing organic impurities should be maintained at a level of less than 60 ppm. Such materials also adversely affect the color of the polymer. The recovered polymer should contain less than 20 ppm of lithium as the presence of lithium also adversely affects the color of the polymer. A principle advantage of the process of the present invention is that polymers with a very low degree of yellowness can be prepared employing low levels of lithium initiator. Desirably, polymerization in accordance with the present invention utilizes the conversion of monomer to polymer greater than 99 weight percent of monomer plus polymer present in the reactor at any point. Generally, a batch polymerization using a plug flow reactor results in polymers of increased yellowness when compared to polymers prepared in accordance with the present invention. The batch and plug flow reactors generally require greater quantities of lithium containing initiator than does the method of the present invention.

The invention is further illustrated but not limited by the following examples:

EXAMPLE 1

Apparatus was employed generally in accordance with FIGS. 1 through 3. The cracker had three sections: a pre-heating section about 4 feet long filled with ceramic Beryl saddles, a 2 foot long cracking section having an hourly space velocity of 2.14 reciprocal hours and was filled with a cracking catalyst commercially available under the trade designation of Shell 105 containing ferric oxide. The cracking temperature was about 625° C. and the pressure was about 5 pounds per square inch gauge. In the third section of the cracker, the temperature was reduced to about 300° C. The first two cracker sections were heated by ceramic heaters, each about 2500 watt capacity and the ratio of water to ethylbenzene was about 0.9. The condenser equivalent to condenser 24 was water cooled. Between the condenser 24 and the decanter 26 was a gas liquid separator 25 which was a flat vessel about 30 cubic inch capacity. From the gas liquid separator crude styrene was pumped from a tank equivalent to tank 27 into the first distillation column. The first distillation column was about 2 inches in diameter and packed to provide in excess of 40 height equivalent of theoretical plates and was employed to remove the light fraction from the crude mixture. Benzene, toluene and water were the primary materials removed. The bottom fraction from column 1 was fed to the second distillation. The first distillation column was operated under a pressure of 130 millimeters of mercury and had a bottom temperature of about 90° C. and a reflux ratio of about 5:1. The second distillation was 4 inches in diameter, packed and had 40 height equivalent of theoretical plates. The second distillation column was operated under a pressure of 110 millimeters of mercury and a temperature of about 85° C. bottom. The reflux ratio was 6:1. The overhead composition removed from the second distillation column was a mixture of styrene and ethylbenzene in about a one to one ration. Bottoms were principally tars and para-cymene. Both columns had a residence time of about 2 hours. The storage vessels equivalent to tanks 43 and 44 had a residence time of about 24 hours. Both tanks were maintained under an atmosphere of nitrogen having a pressure of about 20 pounds per square inch gauge. Impurities other than styrene and ethylbenzene were maintained at a level below a hundred parts per million by weight. Material from the tank 44 was forwarded to a continuously stirred tank reactor 46 by means of a double-headed one-quarter inch Milton-Roy piston pump. The reactor was a recirculating coil constructed of one-inch inside diameter 316 stainless steel tubing connected in a square configuration. The tubing was jacketed and heated with hot water. The contents of the stainless steel tubing reactor were circulated therein using a Northern gear pump, stock No. 4448, operating at about 200 rpm. The internal volume of the reactor was 1867 cubic centimeters. The gear pump was located adjacent the inlet of the ethylbenzene and initiator and downstream thereof to provide prompt mixing of the initiator and feed mixer with the viscous polymerizing mass recirculating within the reactor. Pressure in the reactor was maintained at 50 pounds per square inch gauge by manipulation of a pressure control valve, such as valve 64 of FIG. 1. The polymerization initiator employed was normal-butyllithium which was purchased as a 15% solution in heptane and prior to use was diluted with toluene to provide a normal-butyllithium concentration of from about half to one percent by weight. The pump employed to forward the normal-butyllithium was a Milton-Roy piston pump driven by a variable speed electric motor controlled by a computer.

In the computer program, Statements 2–16 initialize all variables and clear all cards. The real-time clock is set up for use and is started. Statements 19–43: these statemnts control the display of the 9825. This display can be changed by the operator by pressing special function key (SFK) fl on the computer. Statements 44–126: these statements calculate the Mw of the polymer from the detector readings. This segment is executed when all the readings are collected and is under control of the valve subroutine. Statements 88–91 are those that actually modify the colorimeter-initiator addition rate control loop. Statements 98–100 print the Mw information on the paper tape. Statements 130–134: this subroutine allows offline input of Mw; that is, the operator can input Mw information from another outside source (e.g., another GPC) and modify the colorimeter-initiator addition rate control loop. Statements 135–171: these statements contain the subroutines "valves" and "longvalves". "Valves" controls the GPC sampling valves when the GPC cycle is less than 30 minutes. This control is accomplished through writing to the relay card and turning specific relays on and off. This in turn, opens and closes Whitey* ball valves by supplying power to ASCO* solenoid valves through the relays. The length of the GPC cycle is defined as how often Mw information is received, that is, how often a sample is prepared and run through the GPC. The frequency of standardization (how many samples follow a standard) can be varied through variable V[15]. In addition, the GPC cycle (V[3]) can be varied in 5 second increments. The other variables involved with this subroutine control the injection time, V[28], and when the computer "looks" at the GPC detector for the elution of the injected sample, V[17] and V[20]. "Longvalves" has all of the above features with some minor changes: (1) it is used for GPC cycle times greater than 30 minutes and (2) it allows only the sample cycle of std, sample, std, sample . . . Statements 172–190: the subroutine "clock" does two important things. First, it decides upon interrupt, what the real-time clock is signalling must be read from the outputting instruments. Secondly, it reads the input signal, either from the colorimeter or the GPC detector. Subroutine "detector" is used for reading the GPC detector. Statements 228–238: this is the colorimeter control subroutine. This routing calculates the continuously changing initiator addition requirements based on the anion concentration in the reactor effluent. It then outputs a new voltage on the D/A card to change the rate of addition. This is done by varying the amount of power supplied to the motor which runs the initiator addition pump. The computer outputs a 0–10 V signal to a PARAJUST* motor controller, which in turn then varies the power output to the motor. Special Function Key Tape: this is a printed copy of the statements which are stored in the special function keys of the computer. These statements allow operator control over the mode of control, variable value, display, etc. These statements are stored on a cassette tape and loaded into the memory of the computer in statement #4 (trk 1, ldk 1).

It should be noted that not all of the statements of the computer program were employed.

EXAMPLE 2

A feed stream was purified by pumping a 1 to 1 by weight mixture of styrene and ethylbenzene using a double-headed Milton-Roy pump. The mixture was prepared through a heat exchanger which raised the temperature to 55° C. The heated stream was discharged though a spray nozzle into a receiver which had an internal pressure of 20 millimeters of mercury. Spraying into the receiver served to remove oxygen and most of the water present; about 1.5 weight percent of the stream was lost. From the receiver, the feed materials were passed through a molecular sieve commercially available under the trade designation of Linde 3A, the bed of molecular sieve at a length to diameter ratio of 18 and a velocity of 5 parts of the stream per part of sieve by weight per hour. The resultant feed material contained styrene and ethylbenzene in about a 1 to 1 ratio, less than 1 ppm of oxygen; less than 3 ppm of water; less than 5 ppm benzaldehyde; less than 5 ppm styrene oxide; less than 5 ppm of acetophenone; and about 40 ppm of phenylacetylene. The purified styrene ethylbenzene feed stream was pumped to a polymerizer employing a double-headed ¼" Milton-Roy pump. The polymerizer was a 2-liter generally cylindrical reactor, commercially available under the trade designation of Parr, and a hollow auger agitator, the hollow auger comprising a cylinder slightly shorter in length than the interior of the auger and slightly smaller in diameter. A land was helically disposed on the outside of the cylinder. The land was sized such that the cylinder generated by rotation of the hollow cylinder and land was slightly less than the internal volume of the reactor. Such an agitator is described in U.S. Pat. No. 4,239,863, the teachings of which are herewith incorporated by reference thereto. Hot water under pressure was employed to heat the reactor to 95° C. The purified feed stream and initiator were introduced into the side of the reactor at a rate to give a two-hour residence time. The initiator was normal-butyllithium pumped at a rate to provide about 60 ppm. The pressure within the reactor was maintained at about 50 pounds per square inch gauge using a pressure control valve at the outlet. The stream from the reactor was fed to a terminator coil of 1 inch inside diameter, 316 stainless steel tubing connected in a square configuration and having an internal volume of about 467 cubic centimeters. Material was recirculated within the terminator coil using a Northern gear pump stock No. 4448 operating at about 200 revolutions per minute. A solution of 1 weight percent ethanol in ethylbenzene was fed to the terminator coil at a rate about twice that of the normal-butyllithium fed to the polymerizing vessel. Effluent from the terminator coil was then pressure fed into a devolatilizer equipped with a flat plate heater and a screw extruder such as described in U.S. Pat. No. 3,014,702, the teaching of which is incorporated by reference thereto. The exterior of the heater was maintained at a pressure of about 35 millimeters of mercury and the reaction mixture heated to a temperature of about 240° C. to provide a polymer containing 0.8 weight percent volatiles. The molecular weight of the resultant polymer over a 24-hour period was maintained at plus or minus 5,000 of 210,000 grams moles. The color of the product was excellent and had a yellowness index of 0.007.

EXAMPLE 3

A styrene ethylbenzene mixture about 1 to 1 by weight was purified generally as in Example 1 except on a larger scale, approximately 1,000 times larger than that of Example 1. The molecular sieve bed had a length to diameter ratio of 40 to 1 and a velocity of 2.5 parts of feed per part of sieve by weight. The purified feed stream is analyzed to have about 42 weight percent styrene, 58 weight percent ethylbenzene and the following contaminants: less than 1 ppm oxygen; less than 5 ppm water; about 34 ppm phenylacetylene; less than 14 ppm acetophenone; less than 5 ppm benzaldehyde; less than 5 styrene oxide. A polymerization vessel was used which comprised a 500 gallon tank having a condenser mounted vertically above the vessel. The condenser had 157 square feet of cooling surface. The vessel and condenser were supported on weighing cells, the output of which was employed to control the volume of the reaction mixture within the polymerization vessel. A vacuum system was employed to provide a reduced pressure within the vessel. Vapor removal was utilized to maintain desired polymerization temperature. A variable speed pump was mounted on the bottom of the vessel to remove polymer solution therefrom, the speed of the pump being varied to maintain a generally constant polymerization vessel weight. The polymerization vessel was fitted with a hydraulically driven agitator rotating at about 100 revolutions per minute. Condensate from the condenser was recycled to the feed stream. The polymerization vessel was operated under the following conditions: a reactor inventory of 1500 pounds; a feed rate of 850 pounds per hour; a residence time of 1¾ hours; the temperature of the reaction mixture 100° C.; a reactor pressure of 237 millimeters of mercury; normal-butyllithium 80 ppm based on the total weight of the feed; resulting in a product containing 21 ppm lithium and having a yellowness index of 0.029. For a 24-hour period, the weight average molecular weight as determined by gel permeation chromatography was 195,000 plus or minus 10,000. The reaction was terminated by passing the reaction mixture through a section of 1.5 inch pipe containing fiber optic probes and side stream takeoff port which led to gel permeation chromatograph. The reaction mixture was then passed to a section of 6-inch jacketed pipe containing eighteen 6"×8" static mixing elements commercially available from Koch Engineering Company. The jacket was heated to a temperature of about 120° C. and a 5 weight percent solution of ethanol in ethylbenzene was pumped into the reaction mixture prior to its entering the static mixers at 4 opposing points generally displaced about 90° from adjacent points on the pipe at a flow rate of about 5 pounds per hour. After termination, partial polymer was devolatilized using two devolatilizers in series, the first devolatilizer operating at 160° C. and 600 millimeters of mercury and the second devolatilizer at 240° C. and 20 millimeters of mercury.

EXAMPLE 4

The procedure of Example 2 was repeated with the following exceptions. The feed mixture to the reactor was 42 parts by weight paramethylstyrene, 2 parts by weight paraethyltoluene and 56 parts by weight ethylbenzene. The rate of feed was one reactor volume in a period of one and one-half hours. The polymerization temperature was 80 degrees centigrade. The weight average molecular weight of the product obtained over a period of 24 hours was about 34,000±30,000 grams per mole. Extrusion of the resultant polymer through a strand die provided a strand with no visible lumps or gels. The product was suitable for extrusion and injection molding of high quality articles.

COMPARATIVE EXAMPLE 1

The procedure of Example 2 was repeated with the exception that the agitator was not rotated. Over a period of 24 hours the best control of molecular weight that was obtained was about ±100,000 grams per mole. On extrusion of the product a yellow strand was obtained which contained large lumps or gels. A molded product from such a strand has poor color and surface appearance.

COMPARATIVE EXAMPLE 2

A ½ inch diameter 30 inch long jacketed tubular reactor was equipped with a color measuring device and gel permeation chromatograph as described in Example 1. The inlet end of the reactor was fed with a mixture of styrene and ethylbenzene (1:4 by weight), together with a polymerization initiating amount of normal-butyllithium at a rate sufficient to provide a residence time of 15 minutes. Atmospheric steam was applied to the jacket. Temperature sensing probes disposed within the reaction mixture in the reactor indicated the temperature range was about 20 degrees centigrade. Employing the temperature and a gel permeation chromatography signal to control the reaction resulted in product varying ±100,000 grams per mole from average over a 24-hour period. The effluent from the reactor contained large visible gels. The product was not useful as a good quality material for extrusion or injection molding.

COMPARATIVE EXAMPLE 3

A vertical stirred tube reactor was employed having an inside diameter of 6.5 inches and a useful internal length of about 55 inches and a volume of about 0.907 cubic feet. The reactor was jacketed into three about equal zones, each zone having a thermocouple projecting into the reaction mixture. The top driven agitator had a shaft diameter of one inch and 5¼ inch straight arms spaced 2½ inches apart on the agitator shaft. A plurality of ½ inch diameter fixed rods projected radially inwardly into the reactor for a distance of 2.43 inches. The fixed rods interdigitated with the agitator arms on rotation of the agitator. The reactor had a total heat transfer area of 11.16 square feet. The physical arrangement of the reactor was such that the axis of rotation was vertically disposed. The reaction mixture had excellent mixing in planes normal to the axis of the reactor and the agitator shaft while top to bottom mixing was very poor to nonexistent, resulting in what may be considered a plug flow reactor. A pump by means of an external line was connected between the top and bottom of the reactor. The pump was capable of recirculating the contents of the reactor at a rate of 7.5 times per hour. Equal parts by weight of styrene and ethylbenzene purified as in Example 2 and a polymerization initiating amount of a normal-butyllithium solution were pumped into the top of the reactor. The reactants were fed to the reactor at a rate of one-half reactor volume per hour for a residence of 2 hours. The following temperature relationships were observed:

| Polymer Temperature °C. | | | Jacket Temperature °C. | | |
|---|---|---|---|---|---|
| Feed Zone | Middle Zone | Discharge Zone | Feed Zone | Middle Zone | Discharge Zone |
| 99 | 101 | 100 | 101 | 67 | 85 |

In a 24-hour period of operation, the weight average molecular weight could not be maintained closer than plus or minus 50,000 grams per mole. The major amount of polymerization appears to occur in the middle zone of the reactor. On extrusion of the product as a strand, gels or lumps were observed. The polymeric material produced is unsatisfactory for extrusion or injection molding.

In a manner similar to the foregoing examples of the invention, other anionic polymers are readily prepared and the molecular weight of the polymers controlled.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

The computer program employed was as follows:

```
f0:  *Z+1→Z;if Z=
     7;1→Z f1:  *sfg0;spc2;p
     rt "Valves off
     at";cfg1;cfg3;1
     →r50 f2:  *sfg0;spc2;p
     rt"Color contro
     l    off at";sfg
     2 f3:  *sfg0;spc2;p
     rt "Mw control
     off  at";cfg3 f4:  *sfg0;spc2;p
     rt "Reset off a
     t";sfg4 f5:  *sfg10;prt "
     Report on at";s
     fg0 f6:  *→X;sfg5 f7:  *→V[X];sfg6 f11: *if V[3]*12
     >=360 and I>V[2
     0]+130;V[3]*12-
     2→I f13: *sfg0;spc2;
     prt"Valves on a
     t";sfg1;"Stand
     by      "→B$ f14: *sfg0;spc2;
     prt"Color contr
     ol on at";cfg2 f15: *sfg0;spc2;
     prt"Mw control
     on at";sfg 3 f16: *sfg0;spc2;
     prt "Reset on a
     t";cfg4 f17: *cfg 10;prt
     "Report off at
     ";sfg0
```

```
 0: "    Anionic Polymerization Control Program w/GPC:
 1: "    #'s 2-16,Initializes hardware&software":
 2: dim B$[20],A$[14],D[150],T[150],V[35],N[7],W[7],F[7],C$[20],C[3]
 3: "    Initializes variables,loads sp. function keys":
 4: -3}I;3}r8;2}Z;1}R;sfg 7;trk 1;ldk 1;gsb "time"
 5: "    Calls for needed variables,clears 723 bus":
 6: gsb "assign";rds(723)}J;on err "error"
 7: "    fmt#1 for relays,#2 for A/D;#3 for D/A;#4 for display":
 8: fmt 1,"0140TC",fz4.0,"T",z
 9: fmt 2,c,z;fmt 3,c,f4.0,c,z;eir 7
10: "    Clears D/A card":
11: wrt 723.2,"0120TD0000TD2000TD4000TD6000T"
12: "    #'s 14-16 initialize clocks":
13: "    U1 for int/detect.,U2 for int/valves,U3 count/detect.":
14: wrt 9,"A,U1=,U1=01,U2=,U2=02,U3=I3,U4=I4"
15: wrt 9,"U1P3000/U2P5000"
16: oni 9,"clock";eir 9;wrt 9,"U2G"
17: "    #'s 19-43,main display loop":
18: "    Display for sampling system":
19: if Z=1 and flg1;dsp B$,D,V[3]-I/12,K
```

```
20: if Z=1 and not flg1;dsp "   Sampling system is off."
21: if not flg2 and flg3;"Mw Ctrl"}C$
22: if not flg2 and not flg3;"Color Ctrl"}C$
23: if flg2 and not flg3;"Ctrl off"}C$
24: "   Display for control mode & parameters":
25: if Z=2;dsp C$,H,V[5],r32/5.11.
26: if Z=3;dsp "Term. trans.=",P
27: "   Display for GPC data":
28: if flg1 and Z=4 and A/2-int(A/2)=0;fxd 0;dsp "Last Mw=",r21
29: if flg1 and Z=4 and A/2-int(A/2)#0;dsp "Last MWD=",r22
30: if not flg1 and Z=4;dsp "   GPC is off."
31: "   Display for MWD control":
32: "   Flg 5 set by SF Key,denotes operator variable change":
33: if flg5;gsb "variables"
34: "   Flg 9 set by peak-end,enables GPC calc":
35: if flg9;gto "GPCcalc"
36: "   Flg 0 set by SF Key,denotes var. change,gives time":
37: if flg0;wrt 9,"R";red 9,A$;prt A$;cll 'assign';spc 2;cfg 0
38: "   Shut down of valves":
39: if r50=1;wrt 9,"U1HU3HU3C";wrt 723.1,0;0}K}D;-5}I
40: if r50=1;wrt 723.3,"0140TD",2000,"T";wrt 723.3,"0140TD", 6000,"T";0}r50
41: "   End of loop":
42: if Z>6;2}Z
43: fxd 2;gto 19
44: "GPCcalc":cfg 9;gsb "time"
45: prt "GPC Calculation";dsp "GPC Calc. in Progress"
46: "   Finds peak start(S) by weighted avg.":
47: V[1]}r5
48: for J=V[9]+15 to V[9]-1 by -1
49: if J=V[9] and 3*V[1]<r5;prt "No peak-start found.";gto "peak error"
50: if J=V[9];1.1r5}r5;15+V[9]}J;gto 48
51: if D[J]+2*D[J-1]+D[J-2]<=D[J-1]+2*D[J-2]+D[J-3]+r5;gto 53
52: next J
53: J-1}S;V[2]}r6
54: "   Finds peak end(F) by weighted avg.":
55: for J=V[10]-15 to V[10]+1
56: if J=V[10] and 3*V[2]<r6;prt "No peak-end found.";gto "peak error"
57: if J=V[10];1.1r6}r6;V[10]-15}J;gto 55
58: if D[J]+2*D[J+1]+D[J+2]<=D[J+1]+2*D[J+2]+D[J+3]+r6;gto 60
59: next J
60: J+1}F
61: "   Calc. slope(M) and intercept(B) of baseline":
62: (D[F]-D[S])/(T[F]-T[S])}M
63: D[S]-M*T[S]}B
64: "   Subtracts baseline off of peak & checks for neg. values":
65: for J=S to F
66: D[J]-M*T[J]-B}W
67: if J<S+5 and W<=0 and J#S;J}S;gto 62 68:if J>F-5 and W<=0 and J#F;J}F;gto 6
69: next J
70: for J=S to F;D[J]-M*T[J]-B}D[J]
71: next J
72: "   Checks peak size & prints peak data":
73: if max(D[*])>18;prt "Peak too large";gto "peak error"
74: if max(D[*])<2;prt "Peak too small";gto "peak error"
75: prt "Peak-height is",max(D[*])
76: fxd 0;prt "Peak-start is",S;prt "Peak-end is",F
77: gsb "Sum"
78: "   If std., bypass Mw calc.&control":
79: if K=0;0}r9;gto 108
```

```
 80: "    Calc. Mn,Mw,MWD":
 81: r4*r7/r5}r20;r4*r6/r7}r21;r4*r11/r6}r12;r21/r20}r22
 82: wrt 723.3,"0140TD",dto((r21-V[30])/(V[31]-V[30])*500)+2000,"T"
 83: wrt 723.3,"0140TD",dto((r12-V[32])/(V[33]-V[32])*500)+6000,"T"
 84: "    If not Mw control, bypass":
 85: if not flg3;gto 93
 86: "    Check of sample Mw dev. & first samp":
 87: if abs(r21-r35)>V[16] and r35#0;prt "Mw dev.";gto 93
 88: "    Calc. % trans. change":
 89: V[18]*(r21-V[4])/10000}r33
 90: "    Calc. new % trans. setpoint":
 91: V[5]-r33}V[5];r21}r35
 92: "    Round-off Mn,Mw data":
 93: r20*.001}r20;r21*.001}r21;r12*.001}r12
 94: if r20-int(r20)>=.5;r20+1}r20
 95: if r21-int(r21)>=.5;r21+1}r21
 96: if r12-int(r12)>=.5;r12+1}r12
 97: int(r20)*1000}r20;int(r21)*1000}r21;int(r12)*1000}r12
 98: "    Printer output of Mw data":
 99: fxd 0;prt "Mn=",r20;prt "Mw=",r21;prt "Mz=",r12
100: fxd 2;prt "Mw/Mn=",r22;prt "Mz/Mw=",r12/r21
101: "    If Mw control, prt new setpoint":
102: if flg3;prt "New s.p.=",V[5]
103: "    If report mode on, prt":
104: if flg10;gsb "report"
105: "    End of calc, return to dsp loop":
106: 0}D}T;gto 19
107: "    Check if old calib. holds":
108: if abs(r5*r6/r7-V[11])<.001;gto 118
109: "    #'s 119-127 calib. calc., successive iteration":
110: if r5*r6/r7-V[11]>=0;gto 113
111: 1.05r8}r8;gsb "Sum"
112: gto 110
113: if abs(r5*r6/r7-V[11])<.0001;gto 118
114: if r5*r6/r7-V[11]<0;r8}r9;r10}r8;.5(r8-r9)+r9}r8;gto 116
115: r8}r10;.5*(r8-r9)+r9}r8
116: gsb "Sum"
117: gto 113
118: V[12]*r7/r6}r4;fxd 3;prt "Calib. constants"
119: "    Printer output of calib.":
120: fxd 0;prt "C1=",r4,fxd 3;prt "C2=",r8;0}D}T;gto 19
121: "    Summing loop for Mw calc.":
122: "Sum";0}r5}r6}r7}r11
123: for J=S to F
124: exp(r8*T[J])}E
125: r5+D[J]*E}r5;r6+D[J]/E}r6;r7+D[J]}r7;r11+D[J]/E}/r11
126: nex J;ret
127: "    Routine for reset of valves loop upon error":
128: "peak error":if K#0;gto 19
129: 0}K}D}T;-8}I;wrt 723.1,24;gto 19
130: "    Allows offline input of Mw data":
131: "offline":
132: "    Adjusts %trans. setpoint":
133: V[5]-V[18]*(V[19]-V[4])/10000}V[5]
134: prt "New (o1)s.p.=",V[5];ret
135: prt Valves is relay writing routine for GPC cycle time <30 min.":
136: "    I is 5 sec. counter, K is sample counter":
137: "valves":I+1}I;if I=V[3]*12;0}I
138: if K=0 and I=0;wrt 723.1,40;"Inject std.  "}B$
139: if K>0 and I=4-V[28];wrt 723.1,14;"Inject sample"}B$
```

```
140: if K=0 and I=4;wrt 723.1,200;"Running std. "}B$
141: if K>0 and I=4;wrt 723.1,224
142: if K=V[15] and I=5;"Last sample  "}B$
143: if K>0 and I=5;wrt 723.1,20
144: if K<V[15] and I=V[3]*12-118;wrt 723.1,1;"Sample coil  "}B$
145: if K<V[15] and I=V[3]*12-116;wrt 723,1,100;"Stirring     "}B$
146: if I=V[17]+4;wrt 9,"U3GU1G",0}L
147: if I=V[20]+4;wrt 9,"U1HU3HU3C";sfg 9
148: if K<V[15] and I=V[3]*12-6;wrt 723.1,0;"Stir stop  "}B$
149: if K<V[15] and I-V[3]*12-2;wrt 723.1,4
150: if I=V[3]*12-1;K+1}K;if K=V[15]+1;0}K
151: ret
152: "    Longvalves is for GPC cycle>30 min.":
153: "    Std/samp/wait/std/samp/wait... order":
154: "longvalves":I+1}I;if I=V[3]*12;-2}I
155: if I=-2;wrt 723.1,40;"*Inject std. "}B$;0}K
156: if I=3;wrt 723.1,200;"*Running std."}B$
157: if I=4;wrt 723.1,1;"*Sample coil "}B$
158: if I=5;wrt 723.1,0
159: if I=6;wrt 723.1,1
160: if I=7;wrt 723.1,100;"*Running std."}B$
161: if I=V[17]+3;wrt 9,"U3GU1G";0}L
162: if I=V[20]+3;wrt 9,"U1HU3HU3C";sfg 9
163: if I=120;wrt 723.1,0;"*Sample ready"}B$
164: if I=122;wrt 723.1,4
165: if I=127-V[28];wrt 723.1,14;"*Inject samp."}B$
166: if I=127;wrt 723.1,224
167: if I=128;wrt 723.1,20;"*Running samp."}B$
168: if I=V[17]+127;wrt 9,"U3GU1G";wrt 723.1,4000;0}L
169: if I=V[20]+127;wrt 9,"U1HU3HU3C";wrt 723.1,0;1}K;sfg 9
170: if I=V[20]+128;"*Waiting   "}B$
171: ret
172: "    Clock determines which clock (3 or 5 sec) interrupts and branches"
173: "    accordingly. Also contains red for polycolor, termcolor,IR":
174: "clock":wrt 9,"T";rdb(9)}Q;eir 9
175: if bit (0,Q);cll 'detector';gto 189
176: if not flg1 or flg7;gto 179
177: if bit (1,Q) and V[3]*12<360;gsb "valves"
178: if bit (1,Q) and V[3]*12>=360;gsb "longvalves"
179: A+1}A;if A=V[27];0}A
180: if A#0;gto 189
181: C[2]}C[3];C[1]}C[2];C}C[1]
182: wrt 723.2,"0160TA13T0260TAX";red 723,C;otdC/40}C
183: "    This avgs. polycolor over 4 readings for Report":
184: (C+C[1]+C[2]+C[3])/4}H
185: wrt 723.2,"0160TA12T0260TAX";red 723,P;otdP/40}P
186: "    If color cntrl is on, branches":
187: if not flg2;gsb "control"
188: "    Clears IB bus & multiprogrammer":
189: if rds(723)=64;eir 7
190: iret
191: "    Detector reads GPC detector,running clock, and stores data":
192: "detector":L+1}L;eir 9
193: wrt 723.2,"0160TA11T0260TAX"
194: red 723,D;wrt 9,"U3V";red 9,T;T/60000}T
195: otdD}D;D*.005}D;D}D[L];T}T[L]
196: ret
197: "    Supplies display for operator variable change":
198: "variables":if flg5;gsb "time";cfg 5
```

```
199: if X=1;dsp "Peak-start sensitivity factor?"
200: if X=2;dsp "Peak-end sensitivity factor?"
201: if X=3;dsp "GPC cycle time (min.)?"
202: if X=4;dsp "Mw setpoint?"
203: if X=5;dsp "% transmittance setpoint?"
204: if X=6;dsp "Controller gain?"
205: if X=7;dsp "Reset constant?"
206: if X=9;dsp "Minimum peak elution time?"
207: if X=10;dsp "Maximum peak elution time?"
208: if X=11;dsp "Mw dist. of standard?"
209: if X=12;dsp "Molecular weight of standard?"
210: if X=13;dsp "Min. cat. pump speed (%)?"
211: if X=14;dsp "Max. cat. pump speed (%)?"
212: if X=15;dsp "# of samples between std.?"
213: if X=16;dsp "Mw error deviation?"
214: if X=17;dsp "Clock-start counter?"
215: if X=18;dsp "%trans. adjust, constant?"
216: if X=19;dsp "Enter off-line Mw data!"
217: if X=20;dsp "Clock-stop counter?"
218: if X=21;dsp "New cat. pump speed (%)?"
219: if X=27;dsp "Read cycle (5 sec.inc.)?"
220: if X=28;dsp "Injection time (5 sec. inc.)?"

221: if X=30;dsp "Mw Mclytek zero?"
222: if X=31;dsp "Mw Molytek max.?"
223: if X=32;dsp "Mz Molytek zero?"
224: if X=33;dsp "Mz Molytek max.?"
225: if X=0;ret
226: if not flg6;jmp 0
227: cll 'print';ret
228: "    Control of NBL pump from %trans. deviations":
229: control":
230: H-V[5]}r30;r30*V[6]+r31}r32
231: if r32<V[13]*5.11;V[13]*5.11}r32
232: if r32>5.11*V[14];V[14]*5.11}r32
233: if flg4;gto "pumps"
234: r31+r30*V[7]}r31
235: if r31>V[14]*5.11;V[14]*5.11}r31
236: if r31<V[13]*5.11;V[13]*5.11}r31
237: "pumps";wrt 723.3,"0140TD",dtor32,"T"
238: ret
239: "    Routine for printing time of variable change":
240: "time":wrt 9,"R";red 9,A$;spc 2;prt A$;ret
241: "    Output of report data after GPC calc.":
242: "report":fxd 2
243: prt "Pump speed=",r32/5.11
244: prt "% trans.=",H;spc 2;ret
245: "    Checks to see if all needed var. are assigned":
246: "    whenever control mode change is made.":
247: "assign":
248: if flg2;gto 255
249: if V[5]=0;5}X;gsb "variables"
250: if V[6]=0;6}X;gsb "variables"
251: if V[7]=0;7}X;gsb "variables"
252: if V[13]=0;13}X;gsb "variables"
253: if V[14]=0;14}X;gsb "variables"
254: if V[27]=0;27}X;gsb "variables"
255: if not flg1;gto 272
256: if V[3]=0;3}X;gsb "variables"
257: if V[1]=0;1}X;gsb "variables"
258: if V[2]=0;2}X;gsb "variables"
```

```
259: if V[9]=0;9}X;gsb "variables"
260: if V[10]=0;10}X;gsb "variables"
261: if V[11]=0;11}X;gsb "variables"
262: if V[12]=0;12}X;gsb "variables"
263: if V[15]=0;15}X;gsb "variables"
264: if V[17]=0;17}X;gsb "variables"
265: if V[20]=0;20}X;gsb "variables"
266: if V[28]=0;28}Xgsb "variables"
267: if V[30]=0;30}X;gsb "variables"
268: if V[31]=0;31}X;gsb "variables"
269: if V[32]=0;32}X;gsb "variables"
270: if V[33]=0;33}X;gsb "variables"
271: cfg 7
272: if not flg3;gto 276
273: if V[4]=0;4}X;gsb "variables
274: if V[16]=0;16}X;gsb "variables"
275: if V[18]=0;18}X;gsb "variables"
276: ret
277: "   Supplies printed copy of operator variable change":
278: "print":cfg 6;fxd 0
279: if X=1;fxd 3;prt "Upslope factor=",V[1]
280: if X=2;fxd 3;prt "Downslope fact.=",V[2]
281: if X=3;prt "GPC cycle time=",V[3]
282: if X=3 and V[3]*12>=360;sfg 8;prt "Override to longvalves"; beep
283: if X=4;prt "Mw setpoint=",V[4]
284: if X=5;fxd 2;prt "% transmittance setpoint=",V[5]
285: if X=6;fxd 3;prt "Controller gain=",V[6]
286: if X=7;fxd 3;prt "Reset constant=",V[7]
287: if X=9;prt "Min. peak time=",V[9]
288: if X=10;prt "Max. peak time=",V[10]
289: if X=11;fxd 2;prt "MWD of std.=",V[11]
290: if X=12;prt "Mw of std.=",V[12];V[12]}r1}r2
291: if X=13;prt "Min. cat speed=",V[13]
292: if X=14;prt "Max. cat speed=",V[14]
293: if X=15;prt "Samp. cycle=",V[15]
294: if X=16;prt "Mw dev. limit=",V[16]
295: if X=17;prt "Clock start=",V[17]
296: if X=18;fxd 3;prt "% trans. adjust.constant=",V[18]
297: if X=19;prt "Off-line Mw=",V[19];gsb "offline"
298: if X=20;prt "Clock stop=",V[20]
299: if X=21;fxd 2;prt "Pump speed=", V[21];V[21]*5.11}r31
300: if X=27;prt "Read cycle=",V[27]
301: if X=28;prt "Inject time=",V[28]
302: if X=30;prt "Mw Molytek zero=",V[30]
303: if X=31;prt "Mw Molytek max.=",V[31]
304: if X=32;prt "Mz Molytek zero=",V[32]
305: if X=33;prt "Mz Molytek max.=",V[33]
306: 0}X;spc 2;ret
307: "error":wrt 723.1,4000;wait 15000;wrt 723.1,0;stp
*14665
```

What is claimed is:

1. An apparatus for the preparation of anionically polymerized polymers, the apparatus comprising in cooperative combination a monomer supply means, a monomer flow control means associated with a discharge of the monomer supply means, an anionic polymerization initiator supply means, an initiator flow control means in association with a discharge of the initiator supply means, a continuously stirred tank reactor having an inlet and an outlet, the inlet of the continuously stirred tank reactor being in operative communication with the monomer flow control means and the initiator flow control means and adapted to receive material therefrom; a conduit connected to the discharge of the continuously stirred tank reactor, the conduit being in operative communication with an optical means in combination with a control means, the optical means providing a first signal which varies as molecular weight of polymer in effluent from the continuously stirred tank reactor varies, the first signal passing to the control means which is connected to the initiator flow control means so as to adjust the initiator flow control means to thereby provide molecular weight control of a polymer being prepared, a gel permeation chromatograph positioned and arranged with respect to the conduit and the control means so as to receive effluent from the continuously stirred reactor and measure the molecular weight of a polymer and provide a second signal indicative of the molecular weight of the polymer to the control means to adjust the optical means to provide a desired first signal to thereby provide a polymer of a generally uniform molecular weight.

2. The apparatus of claim 1 wherein the optical means to provide a first signal is a colorimeter.

* * * * *